United States Patent [19]
Kranich

[11] Patent Number: 5,752,263
[45] Date of Patent: May 12, 1998

[54] APPARATUS AND METHOD FOR REDUCING READ MISS LATENCY BY PREDICTING SEQUENTIAL INSTRUCTION READ-AHEADS

[75] Inventor: Uwe Kranich, Munich, Germany

[73] Assignee: Advanced Micro Devices, Inc., Sunnyvale, Calif.

[21] Appl. No.: 464,351

[22] Filed: Jun. 5, 1995

[51] Int. Cl.[6] .................................................. G06F 9/38
[52] U.S. Cl. ........................... 711/137; 711/125; 395/856
[58] Field of Search ........................................ 395/464, 452, 395/459

[56] References Cited

U.S. PATENT DOCUMENTS

| | | | |
|---|---|---|---|
| 4,821,185 | 4/1989 | Esposito | 395/872 |
| 4,860,192 | 8/1989 | Sachs | 711/3 |
| 4,860,199 | 8/1989 | Langendorf et al. | 711/213 |
| 4,882,642 | 11/1989 | Tayler et al. | 360/78.11 |
| 5,235,697 | 8/1993 | Steely, Jr. et al. | 711/137 |
| 5,371,870 | 12/1994 | Goodwin et al. | 395/872 |
| 5,388,247 | 2/1995 | Goodwin et al. | 711/143 |
| 5,461,718 | 10/1995 | Tatosian et al. | 711/206 |
| 5,473,764 | 12/1995 | Chi | 395/383 |
| 5,483,641 | 1/1996 | Jones et al. | 395/823 |
| 5,524,220 | 6/1996 | Verma et al. | 395/383 |
| 5,553,305 | 9/1996 | Gregor et al. | 395/676 |
| 5,586,294 | 12/1996 | Goodwin et al. | 711/137 |
| 5,588,128 | 12/1996 | Hicok et al. | 711/204 |

FOREIGN PATENT DOCUMENTS

| 0 457 403 | 11/1991 | European Pat. Off. . |
|---|---|---|
| 0 612 013 | 8/1994 | European Pat. Off. . |

OTHER PUBLICATIONS

Edmondson et al., "Superscaler Instruction Execution in the 21164 Alpha Microprocessor", *IEEE Micro*, vol. 15:33–43, (1995).

Undy et al., "A Low–Cost Graphics and Multimedia Workstation Chip Set", *IEEE Micro*, vol. 14:10–22, (1994).

Primary Examiner—Tod R. Swann
Assistant Examiner—J. Peikari
Attorney, Agent, or Firm—Foley & Lardner

[57] ABSTRACT

An apparatus and method for reducing the time required to supply a processor core with instructions uses a cache memory, a cache controller, and an instruction predecoding unit. When a line of instructions is retrieved into the cache memory, the instruction predecoding unit inspects the instructions in the line to determine if the line contains any nonsequential instructions. The cache controller stores an indication of whether the line contains nonsequential instructions with the line of instructions in the cache memory. If a given line of instructions does not contain any nonsequential instructions, the line of instructions following the given line is retrieved into the cache memory when one of the instructions in the given line is requested by the processor core.

19 Claims, 3 Drawing Sheets

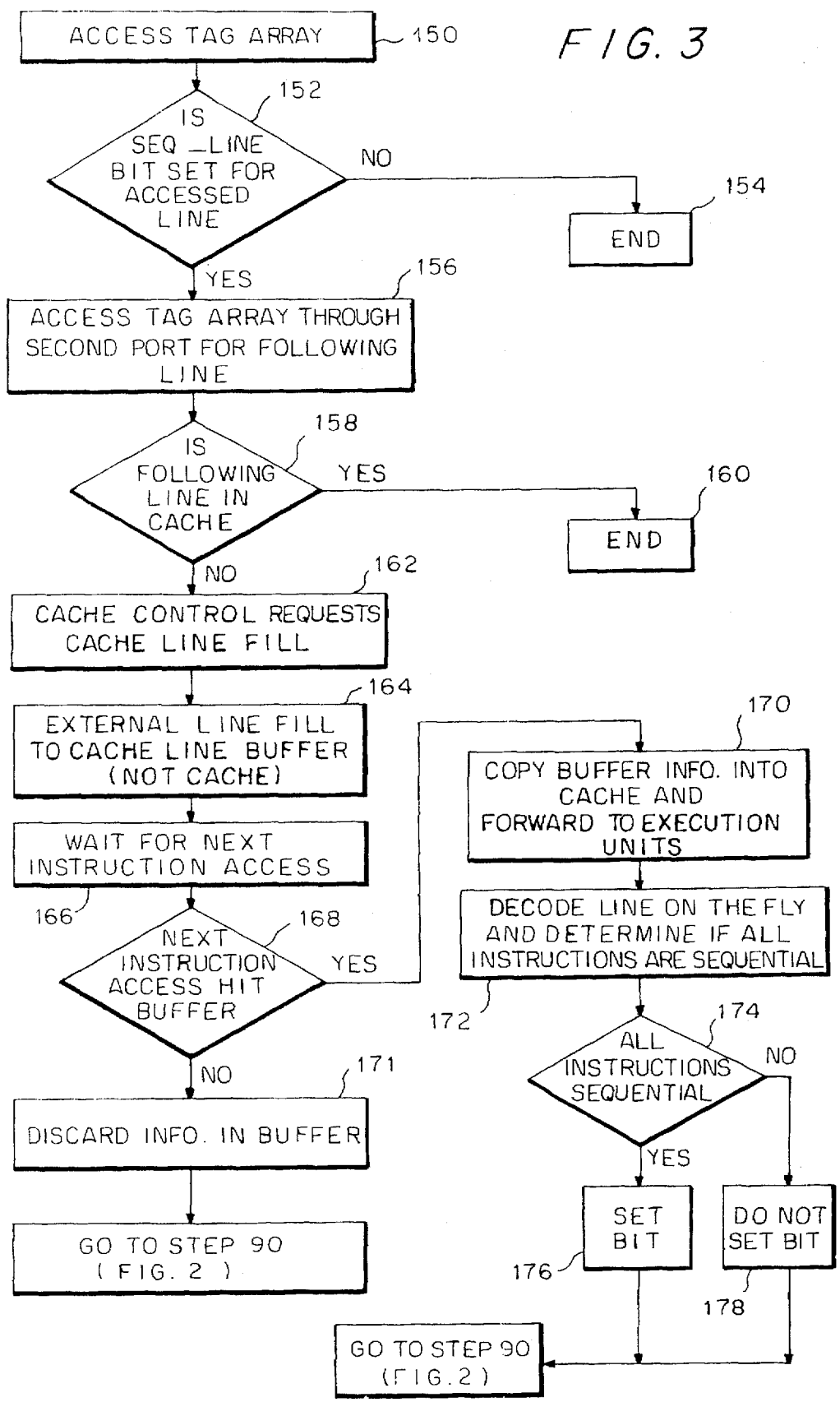

APPARATUS AND METHOD FOR REDUCING READ MISS LATENCY BY PREDICTING SEQUENTIAL INSTRUCTION READ-AHEADS

BACKGROUND OF THE INVENTIONS

The present invention relates to an apparatus and method for reducing the time required to supply a processor core with requested instructions, and more particularly to an apparatus and method for loading a cache with instructions that the processor core is likely to require before the instructions are actually requested by the processor core.

The performance of a computer system is improved by use of cache memory when the instructions and data required by the system's processor are stored in the cache memory at the time such instructions and data are required by the processor. Each time the processor requests an instruction or data which is not stored in the cache memory, an external access operation must be performed to load the required instruction or data into the processor and cache memory. For each such external access, the efficiency of the computer system is reduced.

In light of the foregoing, it is desirable to provide an apparatus and method for increasing the likelihood that information required by a processor is stored in a cache memory at the time that the information is required. It is further desirable to provide an apparatus and method for preloading a cache memory with the instructions that the processor is most likely to require upon the completion of the execution of the present instruction.

SUMMARY OF THE INVENTION

According to one aspect of the invention, a method for reducing the time required to supply a processor core with instructions from a plurality of ordered instructions is provided. The processor core resides in a system having a first storage means and a second storage means. The first storage means is operatively connected with the second storage means by a bus. The first storage means such as a cache memory has a smaller storage capacity than the second storage means, such as a system memory. The method includes the steps of causing the processor core to request a specified instruction of the ordered instructions, and determining whether the specified instruction resides in the first storage means.

If the specified instruction does not reside in the first storage means, a first plurality of contiguous instructions is retrieved into the first storage means from the second storage means over the bus. The first plurality of contiguous instructions include the specified instruction. It is then determined whether all instructions of the first plurality of contiguous instructions are sequential.

If all instructions of the first plurality of contiguous instructions are sequential, it is determined whether a second plurality of contiguous instructions resides in the first storage means. The second plurality of contiguous instructions include instructions ordered contiguously with the first plurality of contiguous instructions. An operation to copy the second plurality of contiguous instructions into the first storage means from the second storage means over the bus is initiated if the second plurality of contiguous instructions does not reside in the first storage means and all instructions of the first plurality of contiguous instructions are sequential.

According to another aspect of the invention, an apparatus for reducing the time required to supply a processor core with selected instructions of a plurality of ordered instructions is provided. The apparatus includes second storage means for storing the plurality of ordered instructions, temporary storage means such as a buffer operatively connected with the second storage means, instruction predecoding means operatively connected with the temporary storage means, first storage means operatively connected with the instruction predecoding means and the processor core, and control means operatively connected with the processor core and the first storage means. The control means receives a first request from the processor core for a first instruction of the selected instructions. The control means determines whether the first instruction resides in the first storage means.

The control means causes a first subset of instructions to be transferred into the temporary storage means from the second storage means if the first instruction does not reside in the first storage means. The first subset of instructions includes the first instruction. The instruction predecoding means receives the first subset of instructions from the temporary storage means, determines whether the first subset of instructions contains at least one nonsequential instruction, transmits the first subset of instructions to the first storage means, and generates a first control signal indicative of whether the first subset of instructions contains the at least one nonsequential instruction. The control means receives the first control signal from the predecoding means and generates a second control signal indicative of whether the first subset of instructions contains at least one nonsequential instruction.

The first storage means receives the first subset of instructions from the instruction predecoding means and the second control signal from the control means, stores the first subset of instructions, and stores an indication of whether the subset of instructions contains at least one nonsequential instruction responsive to the second control signal.

According to another aspect of the invention, an apparatus and method for supplying instructions to a processor of an execution unit is provided using a cache memory and a controller. The controller fetches from a memory a line of instructions including the first instruction requested by the processor. If all the instructions in the line of the instructions requested by the processor are sequential, and if the next line of instructions is not stored in the cache memory, the controller loads a buffer with a line of instructions beginning at the immediately next address. The memory from which the line of instructions including the first instruction is fetched may be the cache memory of another memory external to the apparatus. In order to determine whether an instruction is stored in the cache memory, a tag array is provided storing therein a list of addresses of lines of instructions stored in the cache. By comparing the requested address with the addresses of the lines of instructions stored in the cache, the controller can determine if the requested instruction is found in one of the lines in the cache. In the case of a cache hit, wherein the comparison indicates the requested instruction is in a line stored in the cache memory, the controller forwards the requested instruction to the processor. If a stored indicia, such as a bit, for a line in which the requested instruction is found indicates that all instructions in the line are sequential, and if the next line is not stored in the cache, the cache controller requests a line fill and copies the next line into a buffer. On the next instruction access, if the requested instruction is found in the line of instructions in the buffer, the contents of the buffer is copied into the cache and the instruction is forwarded to the execution unit. In this case, the instruction copied in the cache is decoded and a corresponding entry is added to the tag array. In addition, an indicator is stored for the line having a first condition indicating that all instructions in the line are sequential and having a second condition otherwise. If the next instruction requested is not found in the buffer, the contents of the buffer are discarded.

In the case of a read miss, wherein an instruction requested by a processor is not found in the cache, the cache controller retrieves the requested instruction into a buffer from a memory external to the cache and immediately forwards the requested instruction to the processor. Simultaneously, the cache controller compares the address of the immediately next line of instructions with addresses in the tag array. If the next line is not in the cache and all the instructions in the requested line are sequential, the cache controller loads the next line into the buffer. If the address of the next line is not found in the next requested instruction, the contents of the buffer are discarded. Otherwise, the contents of the buffer are copied into the cache and the requested instruction is forwarded to the execution unit. When instructions are being stored into the cache, a new entry is made in the tag array and an indicator is stored in a first condition if all the instructions in the line are sequential and in a second condition otherwise.

BRIEF DESCRIPTION OF THE DRAWINGS

A system according to the invention, together with further objects and advantages thereof, may best be understood by making reference to the following description taken in conjunction with the accompanying drawings, and wherein:

FIG. 3 is a flow control diagram of the method of operation of a computer system when an instruction is requested by a processor core, and that instruction is currently stored in a cache memory, according to an embodiment of the invention.

DETAILED DESCRIPTION OF THE PREFERRED EMBODIMENTS

Figure 1:
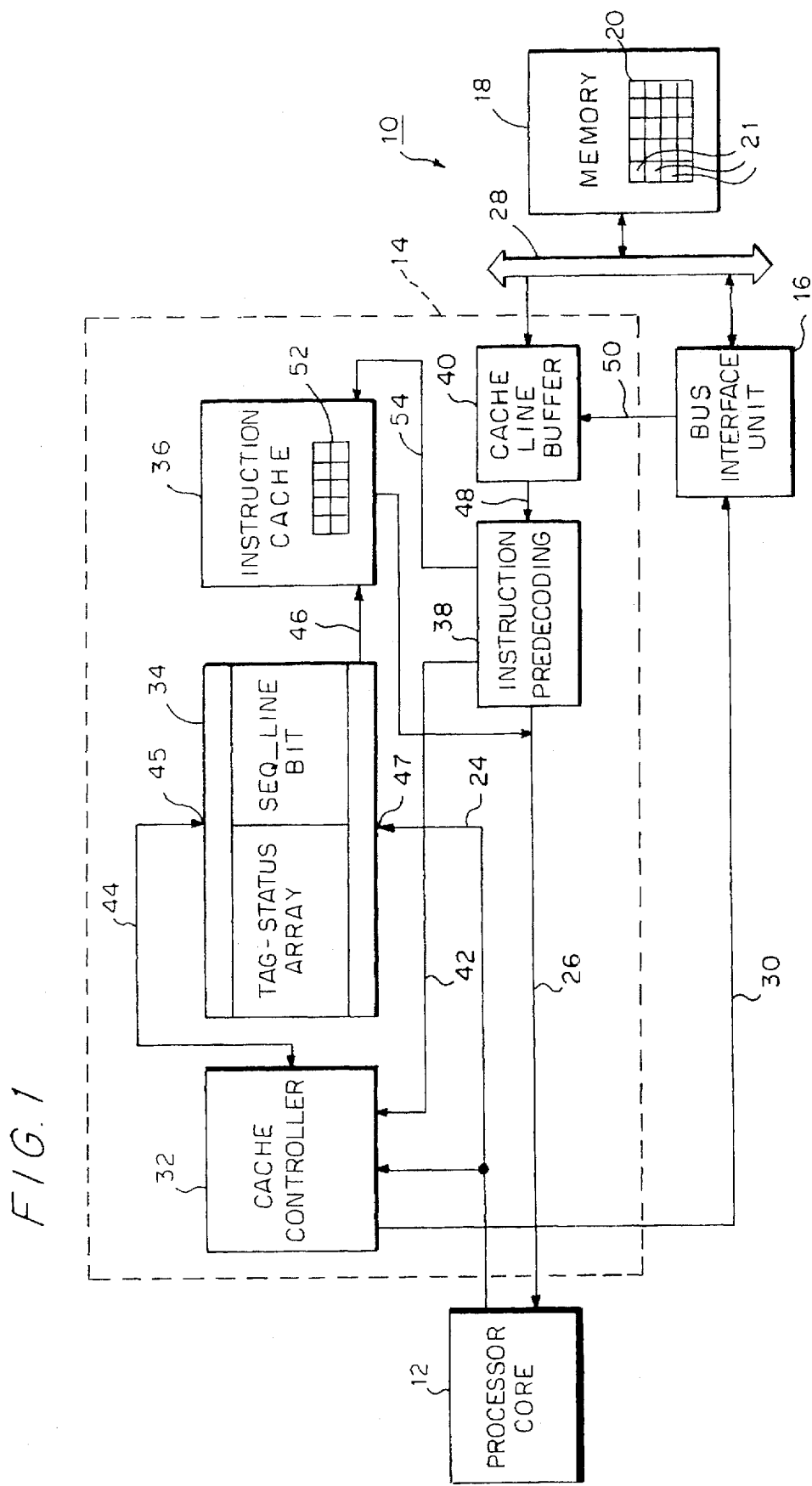
FIG. 1 illustrates a computer system according to the invention.

Referring to FIG. 1, a computer system 10 is illustrated according to the preferred embodiment of the invention. Computer system 10 generally includes a processor core 12, a cache arrangement 14, a bus interface unit 16, and a memory 18.

Processor core 12 generally represents those portions of an execution unit or processor which execute instructions. The instructions to be executed by processor core 12 are stored in a plurality of storage locations 20 in memory 18. Each storage location of the plurality of storage locations 20 has a unique address associated with it. The plurality of storage locations 20 are divided into a plurality of lines 21, each of which consists of a plurality of contiguous storage locations. Each line 21 also has an address associated with it. For example, the address for a given line 21 may be the address of the first storage location of the given line 21. The instructions stored in a given line 21 of memory locations 20 are collectively referred to as a line of instructions.

Processor core 12 is connected with cache arrangement 14 by address and control bus 24 and instruction bus 26. Cache arrangement 14 is connected with memory 18 by a bus 28, and to bus interface unit 16 by an address and control bus 30. Bus interface unit 16 is also connected with memory 18 by bus 28.

Cache arrangement 14 generally includes a cache controller 32, a dual port tag array 34, an instruction cache 36, an instruction predecoding unit 38, and a cache line buffer 40. Cache controller 32 is connected with processor core 12 by address and control bus 24, to bus interface unit 16 by address and control bus 30, and to instruction predecoding unit 38 by a control line 42.

Tag array 34 preferably has a first port 45 and a second port 47, although a single port array can also be used. Tag array 34 is connected with processor core 12 by address and control bus 24 through second port 47, to cache controller 32 by an address and control bus 44 through first port 45, and to instruction cache 36 by a signal line 46. Instruction cache 36 is connected with processor core 12 by instruction bus 26, and with instruction predecoding unit 38 by a bus 54. Cache line buffer 40 is connected with instruction predecoding unit 38 by a bus 48 and to memory 18 by bus 28. Cache line buffer 40 is also connected with bus interface unit 16 by a bus 50.

Instruction cache 36 includes a plurality of storage locations 52 for holding instructions. There are fewer storage locations in instruction cache 36 than there are in memory 18. Consequently, only a relatively small subset of the instructions contained in memory 18 can be stored in instruction cache 36 at any given moment. Tag array 34 contains information regarding lines of instructions which are currently stored in instruction cache 36. For example, in tag status array 35, tag array 34 stores the addresses of each of the lines of instructions currently stored in instruction cache 36. As discussed further herein for each line of instructions tag array 34 also stores a corresponding SEQ__ LINE Bit indicating whether all of the instructions in a corresponding line are sequential or not.

When processor core 12 requires an instruction, processor core 12 requests the instruction (the "requested instruction") by transmitting the address of the requested instruction over address and control bus 24. Tag array 34 receives the address of the requested instruction and determines whether the requested instruction resides in instruction cache 36 by comparing the received address with the addresses stored in tag array 34.

The sequence of steps next performed by computer system 10 to supply processor core 12 with the requested instruction is determined by whether or not the requested instruction is included in a line of instructions currently stored in instruction cache 36. The sequence of steps to supply processor core 12 with the requested instruction when the requested instruction is not found in a line of instructions currently stored in instruction cache 36 is described hereafter with reference to FIG. 2. The sequence of steps to supply processor core 12 with the requested instruction when the requested instruction resides in a line of instructions currently stored in instruction cache 36 is described hereafter with reference to FIG. 3.

For the following discussion herein, the line of instructions which contains the requested instruction is referred to as LINE1, the line of instructions stored immediately after LINE1 in memory 18 is referred to as LINE2, and the instruction requested by processor core 12 after the requested instruction is referred to as the second requested instruction.

Figure 2:
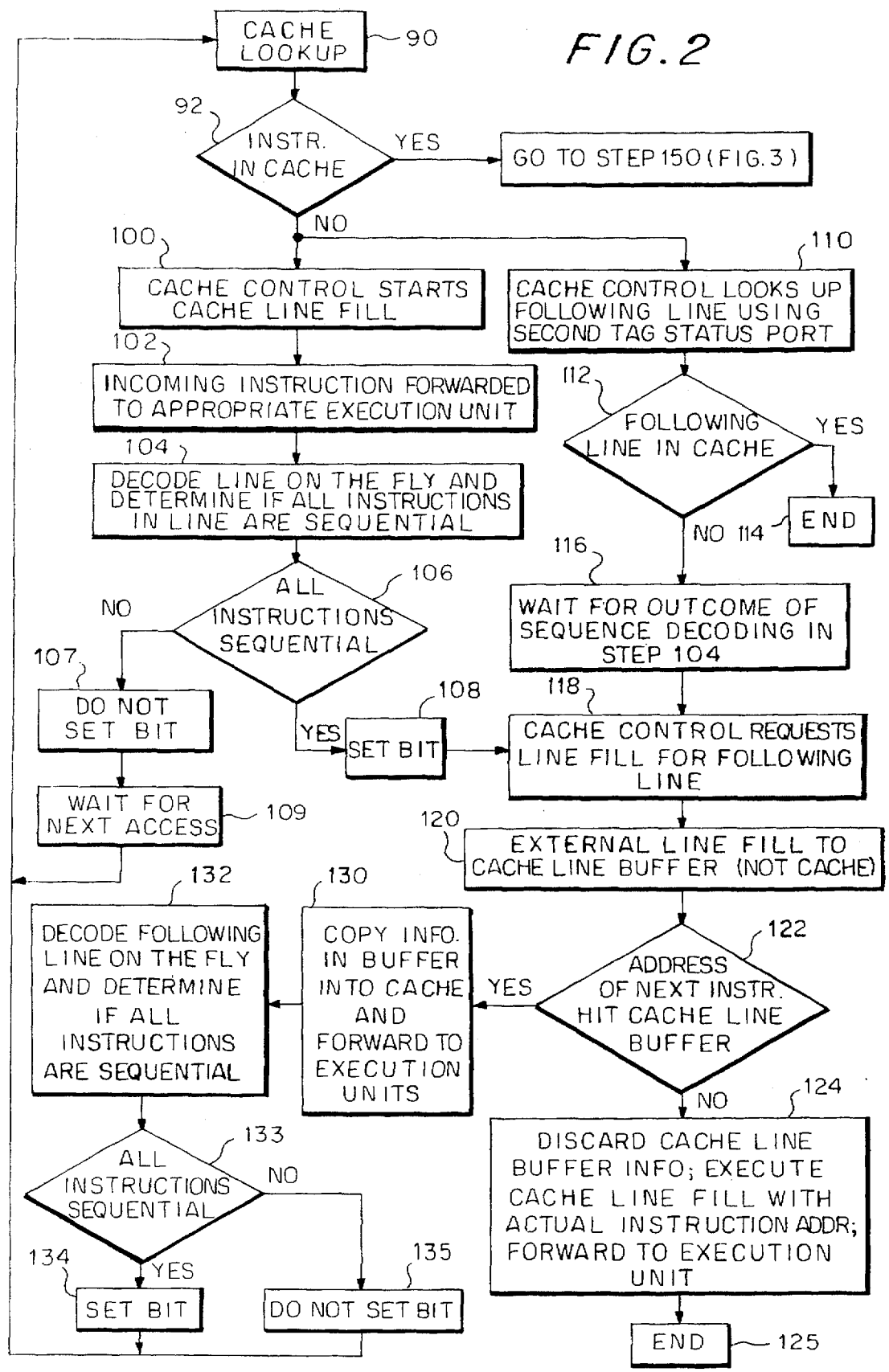
FIG. 2 is a flow control diagram of the method of operation of a computer system when an instruction is requested by a processor core, and that instruction is not currently stored in a cache memory, according to an embodiment of the invention.

Referring now to FIG. 2, a flow control diagram of the operation of computer system 10 is illustrated for the case where an instruction requested by processor core 12 is not currently present in instruction cache 36. Thus a cache look up occurring in step 90 results in a read miss condition as shown in step 92. At block 100, cache controller 32 initiates an operation to fill cache line buffer 40 with LINE1. The instructions contained in LINE1, including the requested instruction, are sent to line buffer 40 over bus 28 during this operation. Specifically, cache controller 32 sends the address of the requested instruction to bus interface unit 16, and bus interface unit 16 broadcasts the address of the required instruction over bus 28. In response to the address on bus 28, memory 18 begins to transmit the instructions from LINE1 (which contains the required instruction) to cache line buffer 40 over bus 28.

In block 102, instruction predecoding unit 38 processes the instructions contained in LINE1 as they arrive in cache line buffer 40 and are transmitted over signal line 48, and forwards the requested instruction to the appropriate execution unit such as processor core 12 over bus 26. In step 104, instruction predecoding unit 38 processes the instructions of LINE1 by inspecting each of the instructions on the fly to determine whether any of the instructions are nonsequential. A given instruction is nonsequential if execution of the instruction would cause the execution unit to request an instruction other than the instruction immediately following the given instruction. Examples of nonsequential instructions may include jump, call, gosub, and branch instructions. Instruction predecoding unit 38 determines whether an instruction is a sequential instruction or a non-sequential instruction by a method known to one of ordinary skill in the art, such as by decoding the opcode of the instruction, for example.

At block 106, instruction predecoding unit 38 completes processing LINE1, and transmits a signal over line 42 indicative of whether any of the instructions in LINE1 are nonsequential. Cache controller 32 receives the control signal on line 42 and sends a signal over address and control bus 44 to store an indication of whether LINE1 contains any nonsequential instructions in tag array 34. Preferably, a bit (SEQ_LINE) within tag array 34 may be used as shown in step 108 to indicate an all-sequential status of each line of instructions. For example, if all of the instructions in a given line of instructions are sequential, the SEQ_LINE bit in tag array 34 corresponding to the given line of instructions may be set to a logic "one" state. Conversely, if even one instruction of the given line of instructions is nonsequential, the corresponding SEQ_LINE bit in tag array 34 is set to a logic "zero" state. When the sequential bit is set to the logic "zero" state as in step 107, no further operations take place and the system waits for the next access, as shown in step 109.

The steps in blocks 110, 112, and 114 are executed in parallel with the steps 100-109 described above. In step 110, cache controller 32 determines the address of the line instructions immediately following LINE1 (i.e., the address of LINE2). This may be accomplished, for example, by adding a predetermined value to the address of LINE1, the predetermined value reflecting the length of LINE1 (for example, $ADR_{line1}+10_{hex}$) and looking up this next line with the second tag status port 47. Once the address of LINE2 is determined, cache controller 32 sends the address of LINE2 to tag array 34. This initiates a look-up operation in tag array 34 to determine, in step 112, whether LINE2 resides in instruction cache 36. If LINE2 does reside in instruction cache 36, no further operation is required, as shown in block 114. On the other hand, if LINE2 does not reside in instruction cache 36, cache controller 32 waits until LINE1 has been completely inspected by instruction predecoding unit 38 (step 116).

As previously discussed, if instruction predecoding unit 38 determines that even one instruction of LINE1 is not sequential, no further operation is required, as shown in steps 106, 107, 109. However, if in step 106 all of the instructions in LINE1 are determined to be sequential and the sequential line bit is set accordingly in step 108, processing proceeds to block 118, where cache controller 32 requests a line fill for the following line, even if not requested by the processor core 12. The action can be performed immediately, since a valid sequential line bit indicates that the current line fill has been completed. Therefore, in step 120 cache controller 32 sends the address of LINE2 to bus interface unit 16 over address and control bus 30 to initiate a retrieve operation to fill cache line buffer 40 with LINE2 via bus 28. Cache line buffer 40 may be filled immediately, since LINE1 has already been transferred into instruction cache 36. LINE2 is not immediately copied into instruction cache 36. Rather, cache controller 32 waits for the request for the second requested instruction from processor core 12 (the next access).

At step 122, cache controller 32 determines whether the address of the second requested instruction is in LINE2 in cache line buffer 40. If the second requested instruction is not in LINE2, the method proceeds to block 124. At block 124, the information currently residing in cache line buffer 40 (LINE2) is discarded. Cache controller 32 executes the cache line fill with the actual instruction address and forwards the instruction to the appropriate execution unit, e.g., processor core 12.

If at block 122, cache controller 32 determines that the address of next requested instruction hits the contents of cache line buffer 40 (LINE2), the information in the cache line buffer 40 is copied into cache 36 and forwarded immediately to the execution units, e.g., processor core 12, as shown in step 130. Processing similar to that in steps 104-109 then takes place in controller 32 to determine whether all the instructions in the LINE2 are sequential. In particular, at block 132, instruction predecoding unit 38 decodes LINE2 on the fly and sends a control signal to cache controller 32 over line 42 indicative of whether LINE2 contains any nonsequential instructions. At block 133, cache controller 32 sends a control signal over address and control bus 44 to tag array 34 to set the SEQ_LINE bit in tag array 34 which corresponds to LINE2 in instruction cache 36 based on whether LINE2 contains any nonsequential instructions, as shown in steps 134 and 135. Once LINE2 is stored in instruction cache 36 and the SEQ_LINE bit corresponding to LINE2 is appropriately set in tag array 34, no further operation is required and processing returns to step 90.

Referring now to FIG. 3, a flow control diagram of the operation of cache arrangement 14 is illustrated for the case when a cache lookup in step 90 results in a read hit condition in which the line containing the requested instruction (LINE1) initially resides in instruction cache 36. At block 150, cache controller 32 accesses tag array 34 via first port 45 to determine the state of the SEQ_LINE bit in tag array 34 which corresponds to LINE1. At block 152, cache controller 32 determines whether LINE1 contains any nonsequential instructions based on the state of the accessed SEQ_LINE bit. If LINE1 contains at least one nonsequential instruction, no further operations are required, as indicated in block 154.

If LINE1 does not contain any nonsequential instructions (the instructions are sequential), cache controller 32 then accesses tag array 34 through the second port 47 at block 156, to determine, at block 158, whether the following line, e.g., LINE2 at $ADR_{line1}+10_{hex}$, currently is in cache 36. If the next line is in cache 36, no further operation is required, as illustrated in block 160.

If the next line is not in cache 36, it is necessary to retrieve the line (LINE2) from external memory 18. In step 162, cache controller 32 immediately requests a line fill from the following line by sending the address of LINE2 to bus interface unit 16. Bus interface unit 16 initiates an operation to load cache line buffer 40 (not cache 36) with LINE2 from memory 18 via bus 28, as shown in block 164. LINE2 is retrieved at steps 162 and 164 even though processor core 12 has not yet requested any instructions from LINE2.

LINE2 is not immediately copied from cache line buffer 40 to instruction cache 36. Rather, cache controller 32 waits for the execution unit, e.g., processor core 12, to access the next instruction, as shown in step 166. At the next instruction access, in step 168, cache controller 32 determines whether the address of the next requested instruction access results in a hit in cache line buffer 40, i.e., the next instruction is in LINE2.

If LINE2 does not contain the next requested instruction, the method proceeds to step 170 where the information residing in cache line buffer 40 is discarded. Processing then returns to cache lookup in step 90.

If, at step 168, it is determined that the address of the next requested instruction does result in a hit in the cache line buffer 40, the information in the cache line buffer 40 is copied into the cache 36 and forwarded to the execution units, as shown in step 170. This step is followed by processing for sequential line determination similar to the processing used in steps 106–109 and 132–135 in the read miss core discussed with respect to FIG. 2. In step 172, the instruction is decoded on the fly to determine if all the instructions in the line are sequential. If in step 174 all instructions are found to be sequential, in step 176 the SEQ_LINE bit for LINE2 is set appropriately (i.e., logic "one" state). If in step 174 all instructions in LINE2 are not sequential, in step 178 the SEQ_LINE bit for LINE2 is set appropriately (i.e., logic "zero" state). In either case, processing returns to cache lookup in step 90.

On the other hand, if, at step 168, it is determined that the address of the next requested instruction does not result in a hit in the cache line buffer 40, the information stored within the cache line buffer 40 is discarded, as shown in step 171, and the process ends.

To simplify the explanation above, it was assumed that computer system 10 had a single cache level, that memory 18 was connected directly to bus 28, and that memory 18 supplied the instructions for line fill operations in response to addresses broadcast over bus 28. However, in more complex computer systems, cache line buffer 40 may not be directly connected to the system memory 18, and instructions may by supplied by sources other than the system memory 18.

For example, in a multiple-level cache system, cache arrangement 14 may be connected to a second level (L2) cache arrangement (not shown) by bus 28. In such a configuration, the second level cache arrangement receives the address of a requested instruction broadcast on bus 28 and sends the corresponding line of instructions to cache line buffer 40 over bus 28. If the corresponding line of instructions is not currently stored in the second level cache, the second level cache retrieves the line of instructions from the storage component in which it resides, and sends the line of instructions to cache arrangement 14.

Further, if there are other cache-equipped processors that can act as bus masters in computer system 10, memory 18 may not contain the most recently modified version of a requested line of instructions. When such is the case, the line of instructions will be supplied to cache line buffer 40 over bus 28 by the cache-equipped storage component or device which does contain the most recently modified version of the requested line of instructions.

As described in detail above, the cache arrangement 14 according to the invention preloads LINE2 into cache buffer 40 before any instruction from LINE2 is requested by processor core 12 in an execution unit when it is likely that processor core 12 will soon request an instruction from LINE2. Cache arrangement 14 determines that processor core 12 will soon request an instruction from LINE2 when all of the instructions from LINE1 are sequential. As a result, the likelihood that instruction cache 36 will contain a given instruction at the time the given instruction is requested by processor core 12 is greatly increased. The fewer the nonsequential instructions, the greater the performance increase derived from the present invention. Further, there is no performance penalty when the incoming instruction stream contains nonsequential instructions.

A small penalty occurs over bus 28 when LINE2 has been loaded into cache line buffer 40 only to be discarded if it is determined that the next requested instruction does not reside in LINE2. However, this small penalty is minimized by aborting the transfer of LINE2 into cache line buffer 40 as soon as it is determined that the next requested instruction does not reside in LINE2. Computer system 10 may also be a multiple-level cache system, for example, a second, level 2 (L2) cache memory is disposed between cache arrangement 14 and bus 28. In this configuration, cache arrangement 14, processor core 12, bus interface unit 16, and a controller for the level 2 cache (not shown) may all reside on the same semiconductor chip. A small increase in the bandwidth on bus 28 between cache arrangement 14 and the cache controller for the level 2 cache would have minimal effect on the performance and efficiency of computer system 10.

Within the pipeline of typical processors, an instruction fetch operation for a first instruction is completed at least two clock cycles before the first instruction is executed. An apparatus implementing the process according to the invention described herein begins fetching a line of instructions which is likely to contain the next required instruction immediately after the instruction fetch for the first instruction is finished. Thus, when the fetched line contains the next required instruction, the instruction fetch for the next required instruction is performed in parallel with the execution of the first instruction. Since the processor need not wait for the outcome of the execution of the first instruction to begin a fetch of the next instruction, the overall cache line miss latency (i.e., the waiting time between a request for an instruction and the time the instruction is supplied) of the system is greatly reduced.

It is to be understood that the detailed drawings and specific examples given describe preferred embodiments of the invention and are for the purpose of illustration, that the apparatus of the invention is not limited to the precise details and conditions disclosed, and that various changes may be made therein without departing from the spirit of the invention which is defined by the following claims.

What is claimed is:

1. An apparatus for supplying instructions to a processor of an execution unit comprising:
   a cache memory;

a controller for fetching from a memory a line of instructions including a first instruction requested by said processor; and an instruction predecoding unit for determining if all instructions in said line of instructions are sequential and for outputting a sequential instruction signal indicative of whether or not said all instructions in said line of instructions are sequential, wherein, if said sequential instruction signal indicates that said all instructions in said line of instructions are sequential, said controller loads a buffer with a line of instructions beginning at an address of an immediately next line of instructions if said immediately next line of instructions is not stored in said cache memory, wherein said instruction predecoding unit determines, prior to said execution unit performing execution of any of said instructions in said line of instructions, whether or not said all instructions in said line of instructions are sequential.

2. The apparatus as recited in claim 1, wherein said memory from which said line of instructions including said first instruction is fetched is said cache memory.

3. The apparatus as recited in claim 1, wherein said memory from which said line of instructions including said first instruction is fetched is external to said apparatus.

4. The apparatus as recited in claim 1, further comprising a tag array, said tag array storing therein a list of addresses of lines stored in said cache memory for comparison by said controller with an address of said first instruction.

5. The apparatus as recited in claim 4, wherein said controller retrieves said first instruction from said cache memory and forwards said first instruction to said processor if said comparison indicates that said first instruction is in a line of instructions stored in said cache memory, and wherein said line of instructions are written into said buffer based on said sequential instruction signal, irrespective as to whether an address of any instruction in said line of instructions is sequential with respect to an address of any previously executed instruction by said execution unit.

6. The apparatus as recited in claim 5, further comprising stored indicia for each line of instructions stored in said cache memory, each of said stored indicia having a first condition when all instructions in said corresponding line of instructions are sequential and having a second condition otherwise.

7. The apparatus as recited in claim 6, wherein said controller loads said buffer only if said stored indicia for said requested line of instruction is in said first condition.

8. The apparatus as recited in claim 7, wherein said controller copies said line of instructions in said buffer to said cache memory and forwards a next requested instruction to said processor if said next requested instruction is found in said line of instructions in said buffer and otherwise discards said line of instructions in said buffer.

9. The apparatus as recited in claim 8, wherein said controller determines, based on said sequential instruction signal output by said instruction predecoding unit, if all instructions in a line of instructions copied to said cache memory are sequential and sets a corresponding stored indicia to one of said first and second conditions accordingly.

10. The apparatus as recited in claim 4, wherein said controller retrieves a line of instructions including said first instruction into said buffer from a memory external to said apparatus and immediately forwards said first instruction to said processor.

11. The apparatus as recited in claim 10, wherein said controller compares an address of said immediately next line of instructions with addresses in said tag array concurrently with said controller retrieving said line of instructions including said first instruction into said buffer.

12. The apparatus as recited in claim 11, wherein said controller loads said buffer with said immediately next line of instructions if all instructions in said immediately next line of instructions including said first instruction are sequential and said cache memory does not already contain said immediately next line of instructions.

13. The apparatus as recited in claim 12, wherein said controller copies said immediately next line of instructions in said buffer to said cache memory and forwards a next requested instruction to said processor if said next requested instruction is contained in said immediately next line of instructions in said buffer and otherwise discards said immediately next line of instructions in said buffer.

14. The apparatus as recited in claim 13, further comprising stored indicia for each line of instructions stored in said cache memory, each of said stored indica having a first condition if all instructions in said corresponding line of instructions are sequential and having a second condition otherwise.

15. A method as recited in claim 1, wherein said controller, said cache memory and said processor all reside on a single semiconductor chip.

16. A method of supplying instructions to a processor of an execution unit that uses a cache memory and a main memory to retrieve instructions from, the method comprising the steps of:

a) fetching a line of instructions including a first instruction requested by said processor, b) determining, by a predecoding unit, if all instructions in said line of instructions are sequential, and if all instructions in said line of instructions are sequential, c) loading a buffer with a line of instructions beginning at an address of an immediately next line of instructions if said immediately next line of instruction is not already stored in said cache memory, wherein said determining step b) is made prior to said execution unit performing execution of any instruction within said line of instructions.

17. The method as recited in claim 16, wherein said line of instructions is fetched in the step a) from one of said main memory and said cache memory.

18. The method as recited in claim 16, further comprising the steps of:

d) receiving a request for a second instruction by said processor;

e) determining if said second instruction is contained in said cache memory, and if said second instruction is not contained in said cache memory;

i) retrieving said second instruction from said buffer if said second instruction is contained therein; and ii) discarding all contents of said buffer if said second instruction is not contained therein.

19. A method of supplying instructions to a processor of an execution unit that uses a cache memory and a main memory from which to retrieve instructions, the method comprising the steps of:

a) receiving a request for a first instruction from said processor;

b) if said first instruction does not reside in said cache memory, going to step k);

c) fetching a first line of instructions including said first instruction from said cache memory if said first instruction currently resides in said cache memory, and determining if all instructions in said first line of instructions are sequential by checking a sequential status bit that is stored in said cache memory for each line of instructions currently stored in said cache memory;

d) if said first instruction resides in said cache memory and said corresponding sequential status bit indicates that all instructions in said first line of instructions are sequential, determining if an instruction that is sequential to a last instruction in said first line of instructions is also currently stored in said cache memory;

e) if said first instruction resides in said cache memory and said corresponding sequential status bit indicates that all instructions in said first line of instructions are not sequential, going to step n);

f) if said first instruction resides in said cache memory and said corresponding sequential status bit indicates that all instructions in said first line of instructions are sequential, and if said instruction that is sequential to said last instruction in said first line of instructions is not currently stored in said cache memory, retrieving a second line of instructions which includes said instruction that is sequential to said last instruction in said first line of instructions from said main memory and placing said second line of instructions in a cache line buffer;

g) if said first instruction resides in said cache memory and said corresponding sequential status bit indicates that all instructions in said first line of instructions are sequential, and if said instruction that is sequential to said last instruction in said first line of instructions is currently stored in said cache memory, going to step n);

h) receiving a request for a second instruction from said processor, and determining if said second instruction resides in said second line of instructions stored in said cache line buffer;

i) if said second instruction resides in said cache line buffer, copying said second line of instructions from said cache line buffer to said cache memory and concurrently providing said second line of instructions to said processor;

j) if said second instruction does not reside in said cache line buffer, discarding all information stored in said cache line buffer, retrieving said second instruction from said main memory to be sent to said cache memory and to said processor, and going to step n);

k) if said first instruction does not reside in said cache memory, retrieving a third line of instructions which includes said first instruction from said main memory and placing said third line of instructions in said cache line buffer, and concurrently performing a decoding of said third line of instructions external to said processor to determine if all instructions in said third line of instructions are sequential, and concurrently determining if said cache memory includes a next sequential cache line with respect to a cache line which would have contained said first instruction had said first instruction been currently stored in said cache memory;

l) if said next sequential cache line is currently stored in said cache memory, going to step n);

m) if said next sequential cache line is not currently stored in said cache memory, and if said decoding of said third line of instructions performed in step k) has determined that all instructions in said third line of instructions are sequential, initiating an operation to write a fourth line of instructions that corresponds to a next sequential line of instructions with respect to said third line of instructions to said cache line buffer;

n) waiting for a request for said second instruction from said processor.

* * * * *